Jan. 30, 1945.                J. J. BLACK                2,368,405
                    ADJUSTABLE ROOF BOW FOR TRAILERS
                       Filed July 7, 1943         3 Sheets-Sheet 1

INVENTOR.
James J. Black
BY Wood, Arey, Herrout & Evans
    Attorneys.

Jan. 30, 1945. J. J. BLACK 2,368,405

ADJUSTABLE ROOF BOW FOR TRAILERS

Filed July 7, 1943 3 Sheets-Sheet 2

INVENTOR.
James J. Black
BY Wood, Arey, Xerrou & Evans
Attorneys

Jan. 30, 1945. J. J. BLACK 2,368,405
ADJUSTABLE ROOF BOW FOR TRAILERS
Filed July 7, 1943 3 Sheets-Sheet 3
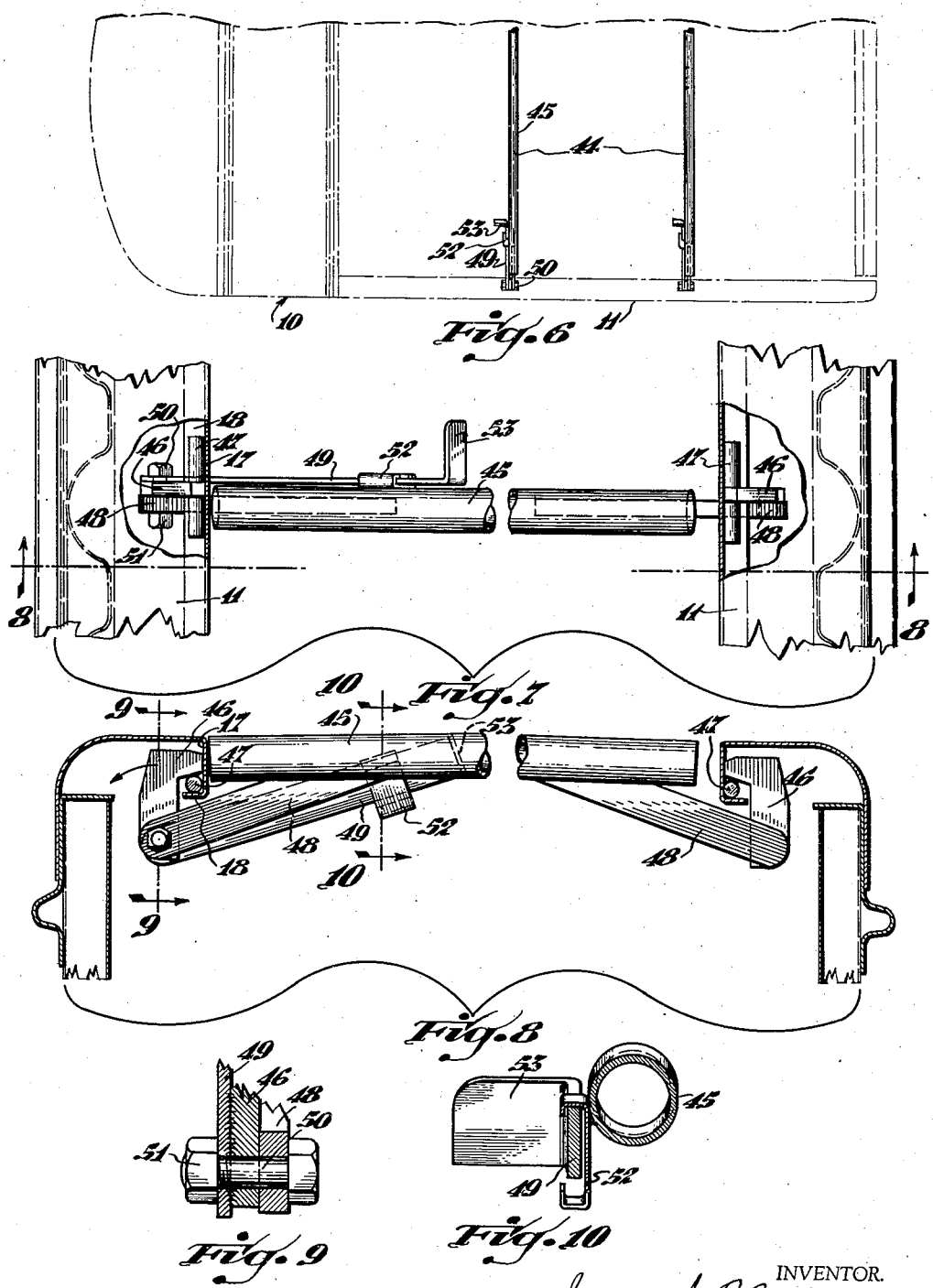
INVENTOR.
James J. Black
BY Wood, Arey, Herron & Evans
Attorneys.

Patented Jan. 30, 1945

2,368,405

UNITED STATES PATENT OFFICE 2,368,405

ADJUSTABLE ROOF BOW FOR TRAILERS

James J. Black, Cincinnati, Ohio, assignor to The Trailer Company of America, Cincinnati, Ohio, a corporation of Delaware Application July 7, 1943, Serial No. 493,693

7 Claims. (Cl. 296—118)

This invention relates to roof bows for trailers, trucks and similar vehicles and is particularly concerned with a construction which permits adjustable positioning of the roof bows at any point desired along the upper rails of the side walls of the vehicle. If desired, the roof bows of the invention may be completely removed and subsequently replaced either in the same or a different position.

In trailers or trucks of the open top type, roof bows perform an important function both in providing a frame work for the support of the conventional canvas top and in preventing the side walls of the vehicle from spreading outwardly. Since most vehicles of this type are loaded from above as by a crane, it is frequently desirable to remove all of the bows from the entire vehicle or at least from that portion of the body which is being loaded from above. After the loading has been completed, it frequently happens that the side walls of the vehicle have been spread slightly so that it is very desirable that the roof bows have a certain range of adjustability sufficient to permit their replacement in position without undue difficulty. It is also desirable that they be so constructed as to perform the function of restoring the side walls to vertical position in the event that an outward spread should occur in the manner described.

Another desirable characteristic in this type of construction is a provision for easy and quick engagement and disengagement of the roof bows. Since they are removed or adjusted to a different position with considerable frequency, if the disengagement and engagement is difficult and cumbersome as in most of the prior art structures, much valuable time will be consumed by the vehicle operator and loader. In addition, where the engagement is too difficult there is a tendency of some operators to leave off the roof bows altogether once they have been removed. If this is permitted for any extended period of time the outward spreading of the side walls may become aggravated to a point where it is difficult to correct.

With the purpose in mind of providing a structure which will meet these conditions, one of the objects of the present invention has been the provision of a roof bow which is readily adjustable and removable but one which at the same time exerts a strong and continuous inward pressure on the side walls of the vehicle.

Another object has been the provision of a roof bow which can be utilized to correct an outward bowing of the side walls which has occurred in the operation of the vehicle or while the roof bow was removed from the vehicle.

Another object has been the provision of a roof bow of standard construction which is adapted to function with an equal degree of utility on various types of open top trailers or trucks.

Other and further objects and advantages will be apparent from the further and more detailed description of the invention when considered in conjunction with the drawings in which:

Figure 6 is a top plan view of a modified form of the invention illustrating a pair of roof bows in operative position. The view is partially broken away at its upper extremity.

Figure 7 is a view similar to Figure 2 illustrating the modified form.

Figure 8 is a view similar to Figure 3 further illustrating the modified form.

Figure 9 is a sectional view along the line 9—9, Figure 8.

Figure 10 is a sectional view along the line 10—10, Figure 8.

Figure 1:
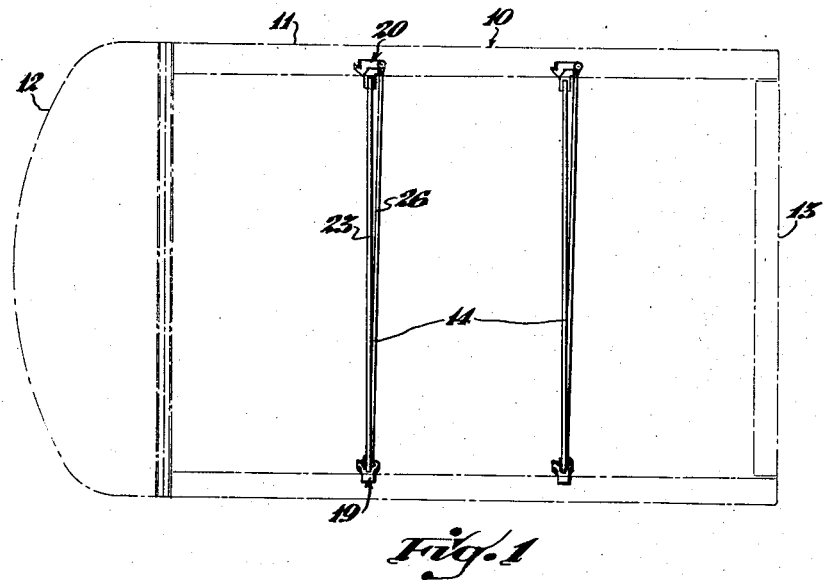
Figure 1 is a top plan view of a vehicle such as a trailer with a pair of roof bows of a type representing the preferred embodiment of the invention in position between the side walls.

In Figure 1 an open top trailer or truck body is indicated generally as 10. The upper side rail members have been designated as 11. The front end of the vehicle shown here as rounded has been designated as 12 and the rear end as 13. A pair of roof bows representative of the type of the invention are shown as in operative position and designated 14.

Figure 2:
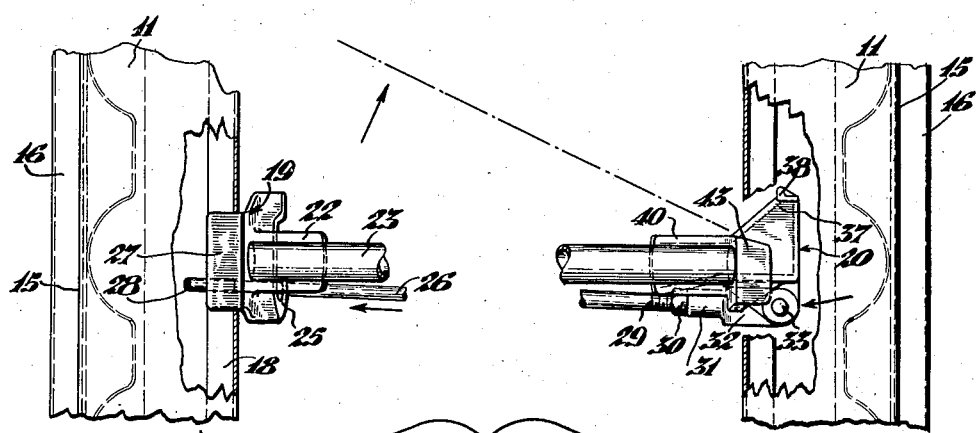
Figure 2 is a similar view enlarged and partially broken away better to illustrate the construction of one roof bow and the method of attachment to the side walls of the vehicle.
Figure 3:
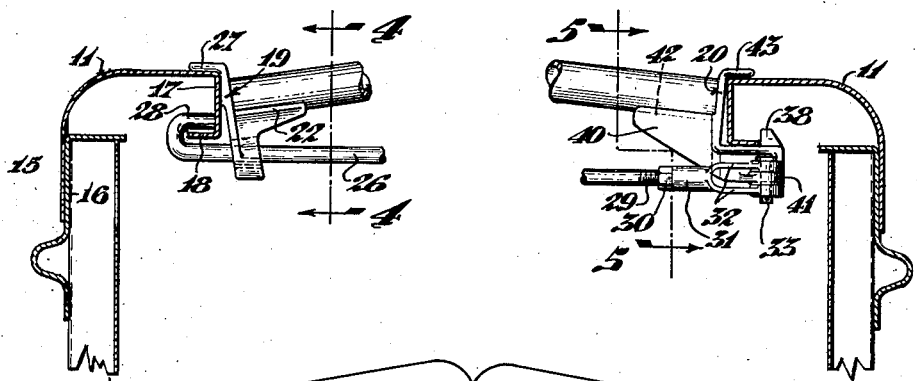
Figure 3 is a front elevation of the roof bow construction, the side walls of the trailer or other vehicle being illustrated in section.

The details of construction of an embodiment of the invention representing the preferred form is best illustrated in Figures 2 and 3. As shown in Figure 3, the upper side rails 11 of the vehicle may include a vertical portion 15 which may be secured to the side walls of the vehicle 16 as by welding. The upper side rails also extend inwardly and are flanged downwardly to form the vertical portion 17 and then inwardly against forming the horizontal lip 18. This particular upper side rail construction is particularly adapted to be used in conjunction with the roof bows of the present invention although there may be various other types of upper side rails with which the roof bows will engage with equal facility.

Figure 4:
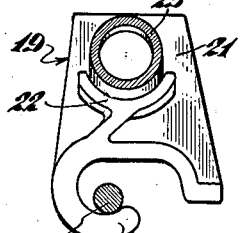
Figure 4 is a sectional view along the line 4—4, Figure 3.
Figure 5:
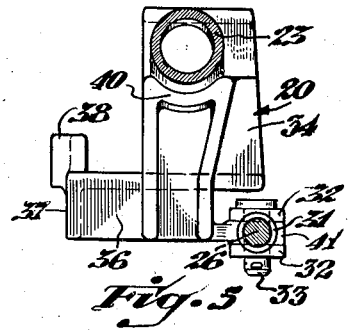
Figure 5 is a sectional view along the line 5—5, Figure 3.

Each roof bow includes generally a pair of brackets 19 and 20 adapted to engage one with each upper side rail. These brackets which are of somewhat different construction, as will be hereinafter further described, preferably are castings. Their exact construction is best illustrated in Figures 4 and 5.

The bracket 19 comprises a plate 21 and a supporting saddle member 22 of general Y configuration in section. One end of the tubular bow member 23 is fixed as by welding to the plate 21 and to the saddle member 22. At its lower surface the bracket is configured to form a hook 25 for supporting the lock bar 26 in locked position. The upper edge of the bracket 19 is turned backward horizontally to form the lip 27 which seats on and engages with the upper side rail member 11 in the manner illustrated in Figure 3. The lock bar 26 is configurated at its end to form the hook 28, the extended point of which is positioned above the lip 18 of the upper side rail of the vehicle when the roof bow is in locked position.

The lock bar 26 has a screw threaded portion 29 at the end removed from the hook (shown at the right in Figure 3). This screw threaded portion engages with the interiorly threaded lock nut 30 positioned on the inner end of the yoke member 31. The yoke member 31 has extended arms 32—32 which have vertical bores formed therein. The shaft 33 passing through these bores and through the extension 41 of the bracket 20 pivotally secures the yoke and lock bar to this bracket.

The bracket 20 comprises the plate member 34 against which the end of the tubular bow member 23 is rigidly secured as by welding. The bracket includes also a side extension 36. This extension is flanged rearwardly as at 37, the rearward extension 37 terminating in a lug 38 which is adapted to engage behind the lip 18 of the upper side wall thereby securing the bracket in position. A reenforcing saddle portion 40 formed as an integral part of the bracket supports the bow member 23 and is rigidly secured thereto along the line 42 as by welding. The bracket 20 also includes a turned-back lip 43 which is adapted to seat on and engage with the upper side rail of the trailer in a manner similar to the lip 27 on the bracket 19.

In securing the roof bow in position the lock bar is first placed in position with the hook 28 loosely engaged around the lip 18 and the bracket 20 in position on the opposite side rail 11 and directly across from the hook 28. The bow 23 carrying the bracket 19 on its other end extends outwardly at an angle to the lock bar along a line indicated by the dot-dash line in Figure 2. When the bow 23 is in this position the bracket 20 retains its engaged position with respect to the side rail 11 by means of the lug 38 and the flange 43 overhanging the top of the side rail 11. It can also be seen that the side of the bracket 20 opposite the lug 38 will be swung toward the opposite side rail 11 as indicated by an arrow in Figure 2. As the bow 23 is swung toward the lock bar the pivot pin 33 joining the lock bar to the bracket 20 is swung away from the opposite side rail 11, thus drawing the hook 28 of the lock bar tightly about the flange 18 of the side rail. As the bow is swung to a position substantially parallel to the lock bar the lower edge of hook 25 passes the lock bar 26 which is then sprung upwardly into the hook 25, as shown in Figure 4, thereby still further shortening the bar and completing the lock. The disengagement of the structure is accomplished by the reversal of these operations. When it is desired to shorten or lengthen the lock bar this can be done while the roof bow is disengaged by screwing it into or out of the yoke member 31 and setting the lock nut 30.

A modification of the structure is illustrated in Figures 6–10, inclusive. In Figure 6 a pair of roof bows 44 of the modified form are shown in position on the upper side rails of a trailer or a similar vehicle. In this modification the tubular bow member 45 is likewise disposed between the upper side rails 11 but is supported differently than in the case of the structure of the preferred form. In the modification a pair of brackets 46 of inverted L-configuration are positioned interior of the flanged portions 17 and 18 of the upper side rails. A cylindrical rod member 47 is rigidly secured to the lip of the brackets as by welding and rests on the flanged portion 18. A supporting brace 48 connects the bow member 45 and the bracket 46. The brace is preferably secured to the bow member on its underside as by welding and supports a bolt 50 in a suitable aperture at its other end.

The locking lever 49 is rigidly secured to the lower end of the bracket 46 as by welding and both elements are pivoted on the bolt 50 through apertures in their ends. The locking lever 49 and bracket 46 are held in place on the bolt 50 by means of a nut 51. The lever is extended inwardly and, in locked position, engages in the C-shaped latch 52 which is welded to the side of the bow member 45. A hand hold portion 53 is flanged laterally at the end of the lever 49.

The bracket 46 at the right of the drawings (Figures 7 and 8) is similarly secured to the bow member 45 by means of a supporting brace 48. However, this brace is rigidly secured to the bracket as by welding.

In the operation of the modification the brackets are positioned with respect to the upper side rails as indicated in Figure 8 and the lever 49 is engaged in the latch 52 and forced upwardly against the upper edge of the latch to prevent escape. When it is desired to remove the structure the lever is slipped from the latch through the opening and moved upwardly. This causes the bracket 46 on the left of the drawing to tilt as indicated and disengages it from the upper rail of the vehicle. After the bracket on the left of the drawing has been removed in this manner the bracket on the right may be removed manually.

The structure of the modification is not adjustable in the same way as that of the preferred form although a certain amount of latitude is provided and the device is easier to construct and operate. Both the preferred form and the modification provides a comparatively simple yet very effective structure for the purposes intended.

Having described my invention, I claim:

1. A roof bow for open top vehicles comprising a pair of brackets adapted to be positioned one on each upper side rail of a vehicle, an upwardly bowed member disposed between the brackets and means for locking the brackets in position, said means comprising a lock bar secured at one end to a bracket and secured at the other end to the opposed side rail of the vehicle, said lock bar being bendable to contract the distance between its ends.

2. An adjustable roof bow for vehicles comprising a pair of brackets adapted to be positioned one on each upper side rail of a vehicle, an upwardly bowed member disposed between the brackets and means for locking the brackets in position, said means comprising a lock bar secured at one end to a bracket, said bracket being adjustable with respect to the side rail on which it is supported by manipulation of the lock bar, and means for maintaining the lock bar in a tension exerting position with respect to the bracket.

3. A roof bow for open top vehicles comprising an upwardly bowed member adapted to be disposed between the upper side rails of a vehicle, means at the ends of said bowed member for supporting it on said side rails, a lock bar interconnected with said bowed member at one end thereof and pivotally movable with respect to said end, and means for supporting the lock bar with respect to the bow to maintain the supporting means in tensioned engagement with the side rails of the vehicle.

4. A roof bow for vehicles comprising an upwardly bowed member adapted to be disposed between the upper side rails of a vehicle, a bracket interconnected with each end of said bowed member for engaging with the side rails of the vehicle, and means for urging one side wall toward the other, said means comprising a locking lever rigidly secured to one of said brackets, said lever and bracket being pivotally movable with respect to the bow whereby manipulation of the lever will first engage the bracket in locked position on the rail, and then urge that rail toward the other.

5. A removable roof bow for vehicles comprising a pair of brackets adapted to be positioned one on each side rail of a vehicle, a top supporting rail member disposed between the brackets and means for engaging and disengaging one of said brackets in locked or unlocked position with respect to its appropriate side rail; said means comprising a lever rigidly secured to said bracket and pivot means for permitting the bracket and lever to move into or out of locking engagement with the side rail upon actuation of the bracket by the lever.

6. A vehicle roof bow comprising a top supporting member disposed between the upper side rails of a vehicle, brackets for supporting the top supporting member on the side rails, a lock bar secured to one of said brackets and pivotally mounted for lateral movement from a point on said bracket laterally offset from the adjacent end of the top supporting member, and rail engaging means on the other end of the lock bar.

7. A roof bow for open top vehicles comprising a bowed member, support means for slidably positioning said bowed member on the side rails of a vehicle, a flexible lock bar pivotally interconnected to one end of the bowed member, the point of pivotal connection being laterally offset with respect to the end of the bowed member, means for attaching the other end of the lock bar to the opposed side rail and means for maintaining the locked bar in flexed position.

JAMES J. BLACK.